Oct. 6, 1959
C. S. McCARTHY
2,907,228
HAND BRAKE SYSTEM
Filed March 7, 1955
3 Sheets-Sheet 1
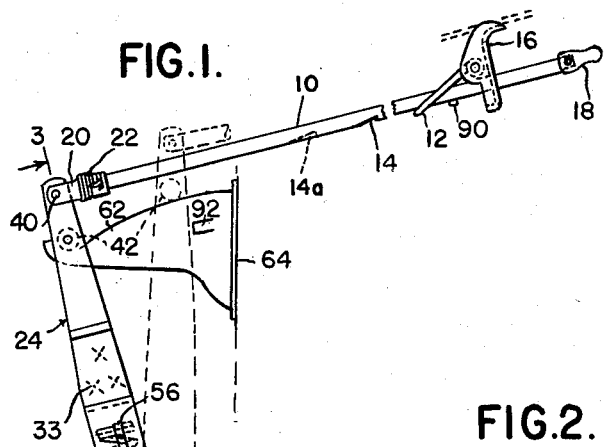
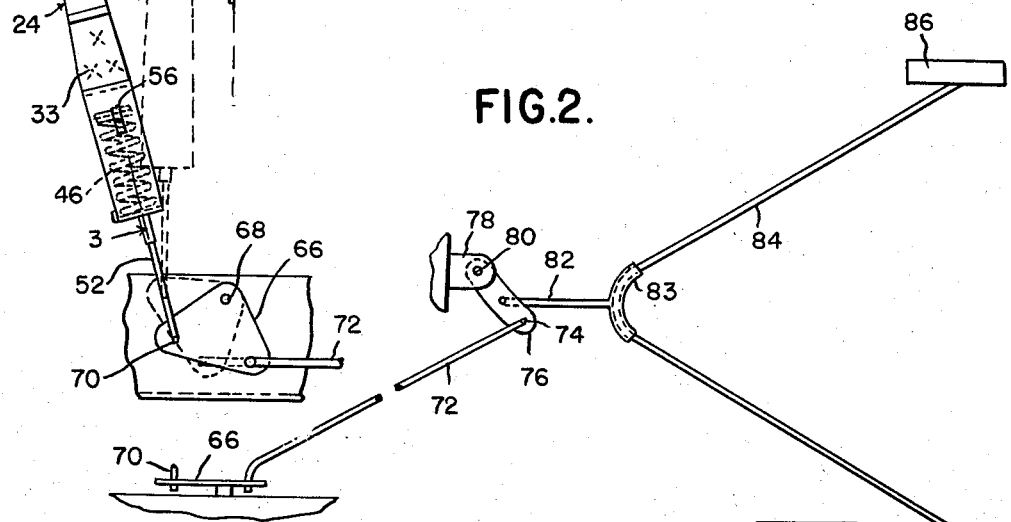
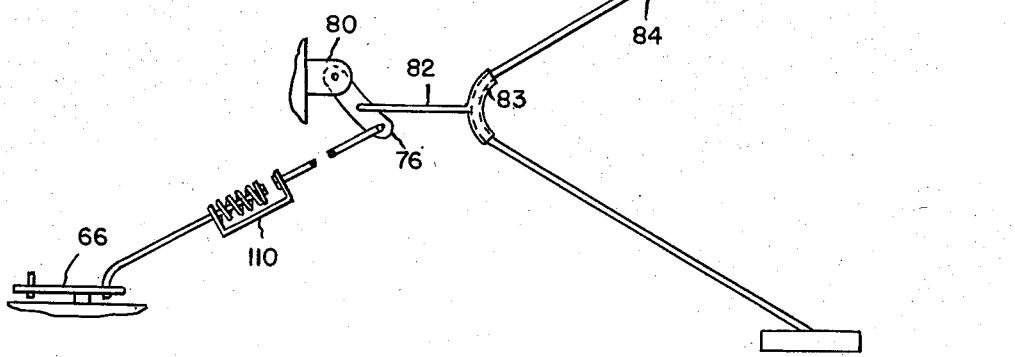
INVENTOR.
CHARLES S. McCARTHY
BY Whittemore
Hulbert & Belknap
ATTORNEYS Oct. 6, 1959   C. S. McCARTHY   2,907,228
HAND BRAKE SYSTEM
Filed March 7, 1955   3 Sheets-Sheet 2
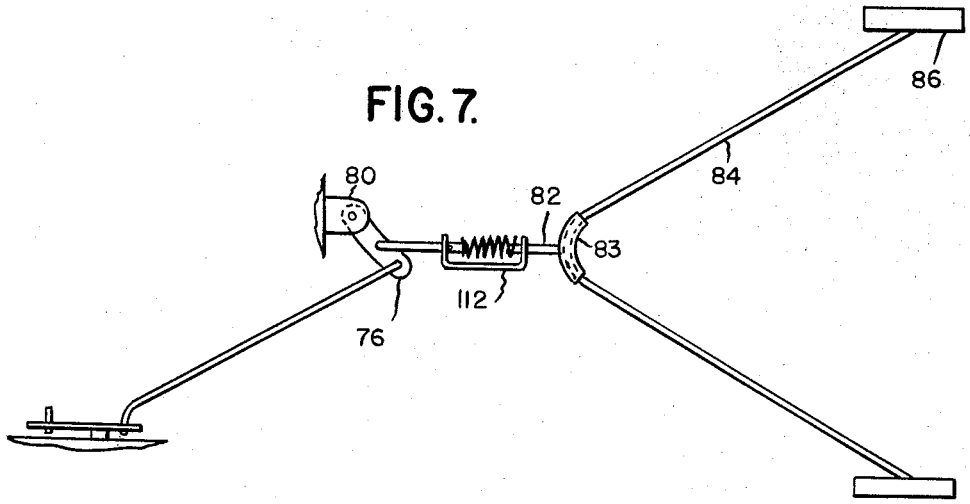
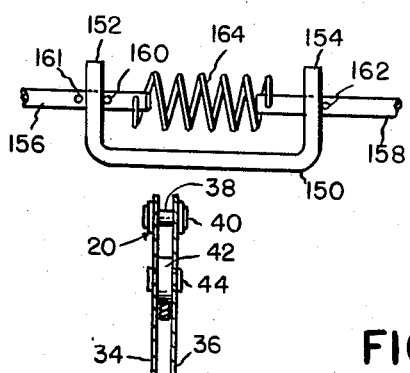
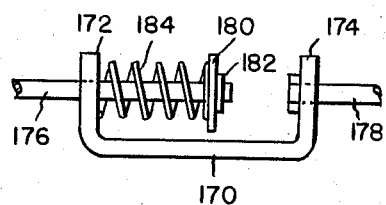
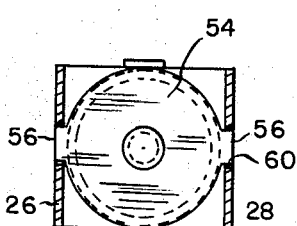
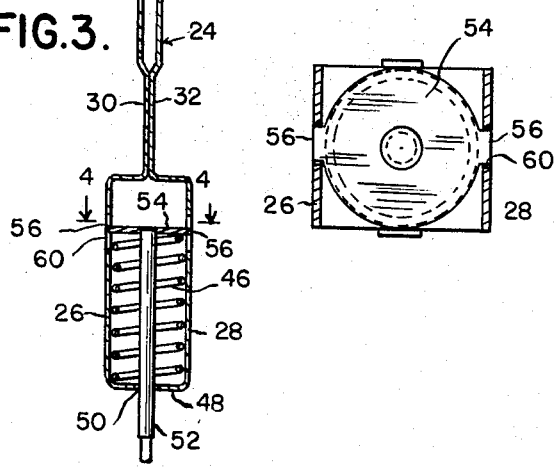
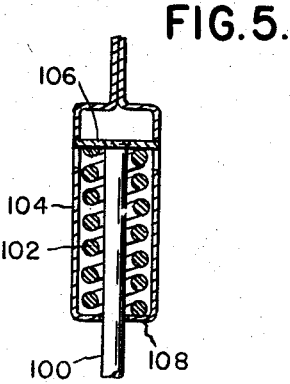
*INVENTOR.*
CHARLES S. McCARTHY
BY *Whittemore,*
*Hulbert & Belknap*
ATTORNEYS Oct. 6, 1959
C. S. McCARTHY
2,907,228
HAND BRAKE SYSTEM
Filed March 7, 1955
3 Sheets-Sheet 3
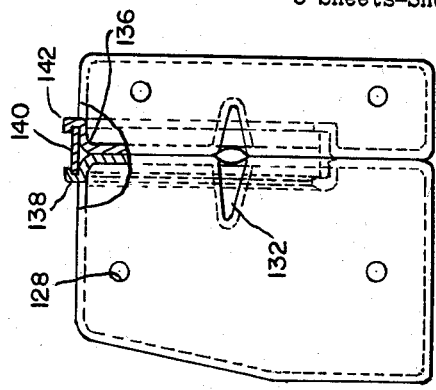
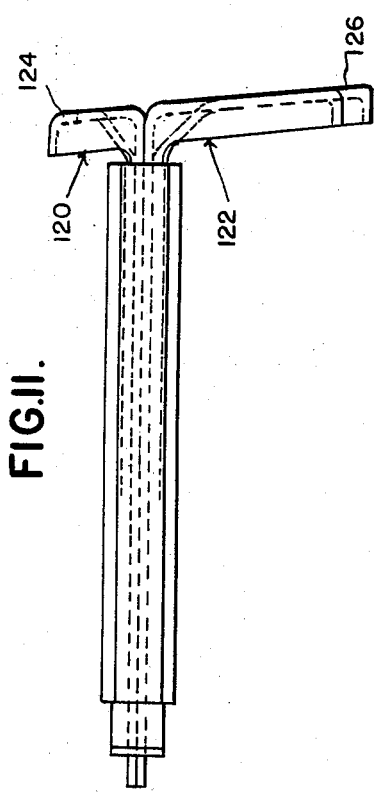
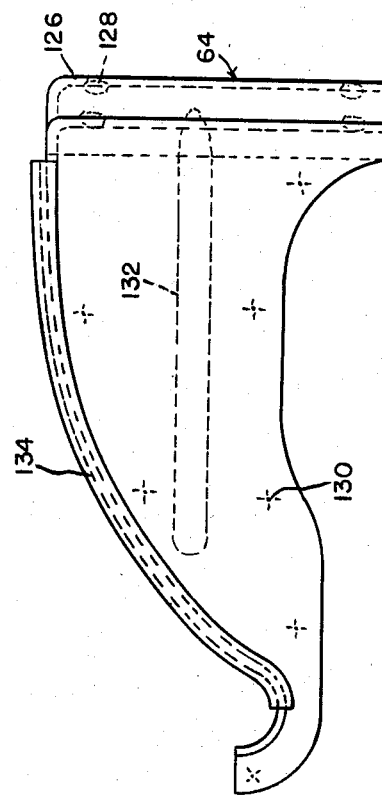
INVENTOR.
CHARLES S. McCARTHY
BY
ATTORNEYS United States Patent Office 2,907,228
Patented Oct. 6, 1959

2,907,228

HAND BRAKE SYSTEM

Charles S. McCarthy, Birmingham, Mich., assignor to American Forging and Socket Company, Pontiac, Mich., a corporation of Michigan Application March 7, 1955, Serial No. 492,581

9 Claims. (Cl. 74—516)

The present invention relates to hand brake systems, and more particularly to a hand brake system designed to permit uniform application of the hand brake by movement of the operator to a definitely predetermined position and to thereby apply a substantially constant braking force in spite of continuous wear in the brake.

More particularly, it is an object of the present invention to provide a hand brake system including a pull rod, latch means for locating the pull rod in a definite position when the brake is applied, tension means for connecting the pull rod and the brake, and preloaded yieldable means in the tension means designed to yield only upon attainment of tension sufficient to produce the required actuating pressure in the brakes.

It is a further object of the present invention to provide an emergency brake system including variable ratio means to permit application of the wheel brakes with a minimum movement of the operating member and at the same time to provide for powerful application of the wheel brakes with a minimum of effort on the part of the driver.

It is a further object of the present invention to provide a variable ratio emergency brake system as described in the preceding paragraph in which tension means are provided interconnecting manual operating means to actuating means on the wheel brake and in which the variable ratio means comprises a cam surface and cam follower.

It is a further object of the present invention to provide an emergency brake system as described in the preceding paragraph, including pre-stressed yieldable means in the tension means to limit and make uniform the brake pressure applied to the wheel brakes independent of wear.

It is a feature of the present invention to provide a cam surface bracket member in the combination described including a pair of plates having curved laterally spaced edge portions, a hardened strip secured intermediate said laterally spaced edge portions slightly inward from the edge thereof to provide a hardened track having guide rails at opposite sides thereof.

It is a further feature of the present invention, in the combination of the cam member referred to in the preceding paragraph, to provide a tension member comprising a pair of arms having spaced portions located at opposite sides of said cam surface, a cam follower in the form of a roll supported between said arms and engaging said track, said tension member including preloaded compression spring means yieldable to permit elongation of the tension member upon attainment of predetermined tension therein.

Other objects and features of the invention will become apparent as the description proceeds, especially when taken in conjunction with the accompanying drawings, wherein:

Figure 1 is a more or less diagrammatic side elevational view of some of the elements entering into a hand brake system.

Figure 2 is a plan view of the remaining elements of the hand brake system shown in Figure 1, including certain elements shown in Figure 1.

Figure 3 is a section on the line 3—3, Figure 1.

Figure 4 is an enlarged sectional view on the line 4—4, Figure 3.

Figure 5 is a fragmentary sectional view illustrating a modified spring support.

Figure 6 is a view similar to Figure 2 illustrating the use of a yieldable member at a different point in the hand brake system.

Figure 7 is a view similar to Figure 6 illustrating the use of a yieldable member in yet another point in the hand brake system.

Figure 8 is a fragmentary elevational view illustrating the use of a tension spring in the system.

Figure 9 is a diagrammatic fragmentary elevational view illustrating the use of a compression spring in the system.

Figure 10 is an elevational view of the cam bracket employed in the brake system.

Figure 11 is a plan view of the cam bracket shown in Figure 10.

Figure 12 is an end elevational view of the cam bracket shown in Figure 10.

Referring now to Figures 1–4, there is illustrated the hand brake system for an automobile. The hand brake system comprises a pull rod 10 associated with a latch, indicated generally at 12, which is adapted to enter a single latch recess 14 provided on the pull rod. The latch 12 is supported from a portion 16 of the dash and the pull rod is provided with an actuating handle at the interior of the vehicle. The notch 14 is disengaged from the latch 12 by rotating the pull rod 10. As is well understood, such rotation of the pull rod is permitted by a yieldable connection between the pull rod and its head 20 and a spring indicated at 22 normally retaining the pull rod and head in properly oriented position.

The head 20 of the pull rod is connected to a tension member 24 which as best seen in Figures 3 and 4, may be formed of a single piece of metal bent to provide an enclosed spring guard structure comprising laterally spaced walls 26 and 28. Above the spring guard the tension member is formed inwardly to provide the arms 30 and 32 which may conveniently be welded as indicated at 33 in Figure 1. Above this point, the portions of the tension member are formed to provide the laterally spaced arms 34 and 36. At the upper end the arms 34 and 36 are provided with a spacer 38 and are apertured to receive a pin 40 connecting the tension member of the laterally spaced arms provided on the head 20. Intermediate the arms 34 and 36 is provided a cam follower in the form of a roller 42 supported on a pin 44 extending through aligned openings in the arms 34 and 36.

Disposed between walls 26 and 28 of the spring guard portion of the tension member 24 is a coil compression spring 46 which extends downwardly and seats on the bottom wall 48 of the spring guard. Extending through the opening 50 is a tension rod 52 connected at its upper end to a washer 54 having diametrically extending ears 56 located in vertically extending slots 60 provided in the walls 26 and 28. In assembly, the spring 46 is preloaded for a purpose which will presently appear.

The roller 42 is adapted to follow the contour of the cam surface 62 provided on a cam bracket indicated generally at 64. It will be observed that when the pull rod is moved to the right from its illustrated position the tension member 24 moves from the full line to the dotted line position which involves an upward or lifting movement of the tension member.

The hand brake system comprises a bell crank 66 mounted for rocking movement about a pivot pin 68. The lower end of the tension rod 52 is connected to the bell crank as indicated at 70. In addition, a tension member 72 is provided which is connected at one end to the bell crank 66 as best indicated in Figure 2, and having its other end connected as indicated at 74 to a compounding lever 76. The compounding lever 76 is pivotally supported on a bracket 78 as indicated at 80. Extending from the compounding lever 76 is a tension member 82 including a yoke which connects to other tension members 84, which may be a cable or the like, extending to the wheel brakes indicated at 86.

The system so far described has been designed to attain several advantages over prior emergency brake systems, whether operated by the usual pull rod or by a foot pedal. The present invention involves variable ratio means, specifically the bracket providing a cam surface 62. This permits a very high ratio as for example, 2 to 1, during initiation of the application of the brakes so as to permit slack in the system to be taken up with a minimum movement of the pull rod or pedal. At the same time, during the final part of the application of the brakes, the ratio may change to a much higher value as for example, 10 to 1, so that relatively small effort is required to produce firm application of the emergency brakes. The employment of the yieldable means in the tension system limits the braking pressure which may be applied at the brakes and at the same time provides means which insures that the applied braking pressure is always uniform, when the operating member such as the pull rod or foot pedal is moved to its single brake applying position.

As a result of the foregoing construction the emergency brake system disclosed herein is designed always to give a proper predetermined braking action, and it is impossible for the operator to apply less than the predetermined braking action. Secondly, the arrangement provides the variable ratio to reduce the effort required to apply the brakes with a predetermined actuating pressure. Thirdly, the arrangement provides a construction in which the overall travel of the brake operating element, such as a pull rod or foot pedal, is reduced to a minimum. Fourthly, the present construction provides an emergency brake system which cannot be partially applied and therefore eliminates the possibility of continued driving with the brakes partially applied and eliminates the wear which would result therefrom.

In accordance with the present invention, means are provided so that the hand brake is applied by the movement of the pull rod 10 to a single definite position and, if desired, suitable abutment means may be provided to insure against the application of excessive force to the camming and multiplying part of the brake system. Thus, for example, an abutment indicated at 90 may be provided on the pull rod and adapted to engage a portion of the dash to limit rearward movement of the pull rod. Obviously, such abutment means could be provided at other places, for example by striking out the arms 92 on the cam bracket 64 to engage the tension member 24 to limit movement thereof by the pull rod.

When the operator learns that the pull rod has but one single applied position he will apply only sufficient force to move it to the brake applying position where it will be maintained in position by engagement between the latch 12 and recess 14. If additional and excessive force is applied it cannot injure the parts since the forces thus applied are not amplified nor magnified but are taken up by direct abutments between the connecting parts. In order that movement of the pull rod to predetermined brake applying position shall apply a constant braking effect, the compression spring 46 is preloaded so that it is designed to transmit forces in tension up to a predetermined amount without yielding. By this means, it is possible to predetermine the force which will be applied by application of the brake and this force cannot be exceeded because the compression spring yields and applies only the predetermined force. Also, the spring will adjust itself to compensate for wear in the brake lining. It will be appreciated that with the parts in the full line position illustrated in Figure 1, the hand brake is off. While the spring 46 is preloaded, further expansion of the spring at this time is prevented by engagement between the ears 56 and the upper end of the slots 60. As the pull rod is moved to the right, as seen in Figure 1, the roller 42 rides up on the cam surface 62, thus moving the tension member 24 upwardly and applying a pull to the bell crank 66 tending to rotate it clockwise. Until the brakes are applied with a predetermined force, the preloaded spring 46 will not yield and the tension member 24 will operate as though it were a rigid link. When however, the wheel brakes 86 are applied with predetermined pressure, further movement of the pull rod 10 will merely result in compression of the spring 46. It will be apparent that the designed compressibility of the spring in operation is a small part of its length and the spring will be selected so that, for all practical purposes, it exerts a substantially constant force when in its two limiting positions as determined by engagement between the ears 56 and ends of the slots 60. It will be further apparent that the location of the ears 56 and slots 60 provides an indication of the condition of the brakes. When the brake linings are new the parts are arranged so that when the brake is fully applied, the ears 56 will be close to the bottom of the elongated slots 60. As the brake linings wear, more slack has to be taken up in the operating system so that application of the brakes does not take place until the tension member 24 approaches its dotted line position. Accordingly, when the brake linings are worn to a point where adjustment is required, the ears 56 will remain close to the tops of the slots 60 when the brakes are fully applied.

Referring now to Figure 5, there is shown a modification of the invention in which the pull rod 100 is of larger size so that it substantially fills the axial opening through the compression spring 102. In this case, the spring guard 104 is illustrated as closely adjacent to the outside of the convolutions of the spring 102. With this arrangement, it will be observed that if the compression spring 102 breaks, the device will not be rendered inoperative since the two sections of the springs will be retained in closely assembled relation between the rod 100 and guard 104. Instead of employing a rod 100 as large as illustrated in Figure 5, it will be appreciated that other spring supporting means, such for example as telescopically arranged tubular sections interposed between the washer 106 and bottom wall 108 of the spring guard, could be substituted in which case the tension rod 100 could be of reduced size.

In the embodiment of the invention thus far described, the preloaded yieldable means in the tension system is of special design and is incorporated in the tension member 24 connecting the cam follower 42 and bell crank 66. Equivalent results may be obtained by locating the preloaded yieldable means at other points in the system. Thus, in Figure 6, which illustrates the same system, the yieldable means designated at 110 is interposed between the bell crank 66 and the compounding lever 76. In like manner and as illustrated in Figure 7, the preloaded yieldable means designated 112 in this figure may be located in the tension member 82 located between the compounding lever 76 and the cable 84. It will of course be apparent that the actual preloading applied to the spring and in fact the selection of the spring will depend upon its location in the system.

Referring now to Figures 10–12, there is illustrated a preferred embodiment of the cam bracket 64. As seen in these figures, the cam bracket is formed from two plates 120 and 122, which are generally similar and which have at corresponding ends thereof flange portions 124 and 126, suitably apertured as indicated at 128 for attachment by screws or the like to a vertical supporting surface such as the fire wall. Intermediate portions of the plates are in abutment and are welded together as indicated at 130. Portions of the plates are formed outwardly to provide stiffening ribs 132. Adjacent the upper edges, the plates are contoured in accordance with the desired cam rise as indicated at 134. In addition, adjacent this cam edge portion, the plates are formed outwardly as indicated at 136 and thence upwardly to provide spaced flange portions 138. Intermediate the flange portions 138 is inserted a hardened wear plate 140 formed of flat stock curved into conformity with the cam profile. Flanges 138 are crimped over the edges of the wear plate. The wear plate is located slightly below the upper edges of the flanges 138 so that these flanges provide guide rails 142 adapted to cooperate with the wear plate 140 to provide a depressed trackway for receiving the cam follower, such as the roller 42 shown in Figure 1.

In assembly of the construction, the spring is forced into assembly as best illustrated in Figure 3, at which time it is subjected to the required preloading. Tests are then made on the cable travel at the compounding lever 76 to determine how far the cable must travel in order to properly set the brakes when the brake linings are set approximately ten to fifteen notches from tight. After this measurement is made, the rear brakes are backed off a prescribed number of notches to approximate the brake lining wear to the point where the service brakes, or the hydraulic brakes, would need adjustment. Cable travel is then measured at that point and the difference between the two is the amount of extra cable travel due to the brake lining wear. This is taken care of in the slots 60 in the spring guard or retainer, so that with the brake lever pulled on, the cable would be adjusted at the compounding lever so that the ear on the washer on top of the spring would be adjusted down in the slot to cover this additional cable travel. In other words, when the brakes are first adjusted they would be adjusted with the ear down near the bottom of the slot with the brakes applied. As the lining wears, the spring is not compressed quite as much. As a result, when the brakes require adjusting the ears will be close to the top of the slot with the brake applied.

In many cases, it is desirable to employ a compression spring but it is to be understood that the present invention is not thus limited. In Figures 8 and 9, there are shown simplified designs showing a tension and compression spring respectively. Referring first to Figure 8, the preloaded yieldable means comprises a U-shaped bracket 150 having spaced ears 152 and 154 provided with apertures through which tension elements 156 and 158 extend. The tension element 156 is provided with abutments such for example as cross pins 160 and 161 bearing against the inner surface of the ear 152. The tension element 158 is provided with an abutment which may be in the form of a cross pin 162 engageable with the outer surface of the ear 154. The adjacent ends of the members 156 and 158 are apertured and receive inwardly formed ends of a tension spring 164. It will be understood that the spring 164 is preloaded to a substantial extent so that tension is transmitted into the spring between the elements 156 and 158, without yielding until the preset loading of the spring is overcome. At that time, the spring may yield until it moves into engagement with the inner surface of the ear 154.

Referring now to Figure 9, there is illustrated a similar arrangement in which the U-shaped bracket 170 is provided with ears 172 and 174 apertured to receive the tension elements 176 and 178. In this case, tension element 178 may be rigidly attached to the ear 174, as for example by a threaded nut, riveting or the like. Tension element 176 however, is longitudinally slidable through the opening in the ear 172 and carries at its rear end a washer 180 retained by suitable means such for example as a nut indicated at 182. Intermediate the washer 180 and the inner surface of the ear 172 is a compression spring 184. The compression spring 184 is preloaded so that the assembly transmits tension between the elements 176 and 178 without yielding until the tension exceeds the preloading of the spring 184. At this time the spring yields so that maximum tension transmitted through the device cannot exceed the force exerted by the spring. It will be appreciated that Figures 8 and 9 are more or less diagrammatic and that the construction illustrated in Figure 9 may for example, include a spring having its convolutions much more closely arranged so that upon braking of the spring, collapse of the spring will be limited to an amount equal to the space between each convolution thereof.

While the invention has been described primarily in conjunction with an emergency brake system including a hand operated pull rod, it is desired to emphasize that in its broader aspects the invention is applicable to other brake systems including an emergency brake system in which operation is effected by a foot pedal rather than a pull rod. It will also be understood that while the variable ratio mechanism specifically disclosed herein comprises a cam surface and cam follower, other types of variable ratio means may be employed, such for example as variable ratio means in which the ratio is varied as a result of links and levers.

It will also be understood that the invention is not necessarily limited to a system including means for providing only a single position of the manual operating means in brake applying position. While this is a preferred embodiment of the invention, it may be desirable in some cases to provide two or even more latch positions of the brake operating member. Thus for example, in the system illustrated in Figure 1 a second notch such as shown in dotted lines at 14a may be provided in the pull rod 10 requiring substantially further rearward movement of the pull rod. This notch is provided for use only under exceptional conditions when extreme braking pressure is required. The location of the notch is such that the ears 56 move to the bottom of the slot 60 so that tension transmitted through the member 24 would not be controlled by the spring. As a result, substantially greater braking pressure will be applied as the movement of the pull rod 10 continues after the ears 56 engage the bottom of the slots 66. In this case the abutment 90 may be omitted or positioned adjacent notch 14a.

The drawings and the foregoing specification constitute a description of the improved hand brake lever in such full, clear, concise and exact terms as to enable any person skilled in the art to practice the invention, the scope of which is indicated by the appended claims.

What I claim as my invention is:

1. In structure of the character described, a bracket providing a cam surface comprising a pair of interconnected plates having adjacent curved edge portions spaced apart, a hardened track secured between said edge portions slightly inwardly from the edges of said plates, said edge portions forming rails at opposite sides of said track.

2. In structure of the character described, a bracket providing a cam surface comprising a pair of plates having adjacent curved edge portions spaced apart, a hardened track secured between said edge portions slightly inwardly from the edges of said plates, said edge portions forming rails at opposite sides of said track, a cam follower in the form of a roller engaging said track and positioned thereon between said rails.

3. In a hand brake system, a bracket providing a cam surface comprising a pair of plates having adjacent curved edge portions spaced apart, a hardened track secured between said edge portions slightly inwardly from the edges of said plates, said edge portions forming rails at opposite sides of said track, a cam follower in the form of a roller engaging said track and positioned thereon between said rails, and yieldable preloaded tension means connecting said cam follower to wheel brakes.

4. In a hand brake system, a bracket providing a cam surface comprising a pair of plates having adjacent curved edge portions spaced apart, a hardened track secured between said edge portions slightly inwardly from the edges of said plates, said edge portions forming rails at opposite sides of said track, a tension member comprising spaced arms at opposite sides of said cam surface and a roller extending between said arms and movable on said track between said rails, and tension means connecting said tension member to wheel brakes.

5. In a hand brake system, a bracket providing a cam surface comprising a pair of plates having adjacent curved edge portions spaced apart, a hardened track secured between said edge portions slightly inwardly from the edges of said plates, said edge portions forming rails at opposite sides of said track, a tension member comprising spaced arms at opposite sides of said cam surface and a roller extending between said arms and movable on said track between said rails, said tension member including a yieldable preloaded compression spring arranged to provide for elongation of said member upon attainment of a predetermined tension, and tension means connecting said tension member to wheel brakes.

6. Hand brake applying mechanism for connection to a movable member in a brake system comprising a fixed bracket having a quick take-up cam surface, a tension link having a cam follower adjacent one end, a pull rod connected to the said one end of said link, latch means for retaining said pull rod in a single predetermined position corresponding to normal brake application, the other end of said link being connected directly to said movable member, said link having spaced walls defining a spring housing therebetween, a pre-loaded coil spring between said walls and having one end fixed thereto, means connected to the opposite end of said spring and connected to the wheel brakes.

7. Hand brake applying mechanism for connection to a movable member in a brake system comprising a bracket having a surface shaped to provide a quick take-up cam surface, a tension link having a cam surface follower adjacent one end, a pull rod connected to said link adjacent its said one end, latch means for retaining said pull rod in a single predetermined position corresponding to normal brake application, said link having adjacent its other end laterally spaced walls connected by a spring seat, a pre-loaded coil compression spring disposed between said walls with one end on said seat, a tension member extending through said spring seat and spring, a spring abutment on said member engaging the other end of said spring, and means for connecting said tension member directly to said movable member.

8. Hand brake applying mechanism for connection to a movable member in a brake system comprising a bracket having a surface shaped to provide a quick take-up cam surface, a tension link having a cam surface follower adjacent one end, a pull rod connected to said link adjacent its said one end, latch means for retaining said pull rod in a single predetermined position corresponding to normal brake application, said link having adjacent its other end laterally spaced walls connected by a spring seat, a pre-loaded coil compression spring disposed between said walls with one end on said seat, a tension member extending through said spring seat and spring, a spring abutment on said member engaging the other end of said spring, at least one of said side walls having a short slot, said spring abutment having an indicating and motion limiting projection movable in said slot, and means for connecting said tension member directly to the said movable member in the brake system.

9. Parking brake applying mechanism for connection to a movable member in a brake system comprising a fixed bracket having a quick take-up cam surface, a tension link having a cam follower adjacent one end, a force transmitting rod connected to the said one end of said link, latch means for retaining said rod in a single predetermined position corresponding to normal brake application, the other end of said link being connected directly to said movable member, tension limiting means in said mechanism between said rod and said movable member comprising a pre-loaded spring yieldable only when a predetermined tension is applied to said link.

References Cited in the file of this patent

UNITED STATES PATENTS

| Number | Name | Date |
|---|---|---|
| 14,186 | Dickerson et al. | Feb. 5, 1856 |
| 413,523 | Kirker | Oct. 22, 1889 |
| 668,007 | Capps | Feb. 12, 1901 |
| 678,298 | Keiley | July 9, 1901 |
| 715,830 | Mason | Dec. 16, 1902 |
| 814,223 | Lynn | Mar. 6, 1906 |
| 1,101,352 | Sumbler | June 23, 1914 |
| 1,308,992 | Pribil | July 8, 1919 |
| 1,552,886 | Shultz | Sept. 8, 1925 |
| 1,562,823 | Dodge | Nov. 24, 1925 |
| 1,601,649 | Schaeffer | Sept. 28, 1926 |
| 1,698,728 | O'Connor | Jan. 15, 1929 |
| 1,751,938 | McKean | Mar. 25, 1930 |
| 1,764,923 | Wilson | June 17, 1930 |
| 1,950,882 | Gianni | Mar. 13, 1934 |
| 2,160,071 | Irving | May 30, 1939 |
| 2,184,294 | Fergueson | Dec. 26, 1939 |
| 2,240,783 | Jandus | May 6, 1941 |
| 2,249,220 | McCann | July 15, 1941 |
| 2,289,506 | Kuebler | July 14, 1942 |
| 2,437,396 | McCarthy | Mar. 9, 1948 |
| 2,555,811 | Peterson | June 5, 1951 |
| 2,588,027 | McCarthy | Mar. 4, 1952 |
| 2,796,774 | Reed | June 25, 1957 |